United States Patent [19]
Terazoe et al.

[11] Patent Number: 6,049,191
[45] Date of Patent: Apr. 11, 2000

[54] COOLING STRUCTURE FOR INDUCTIVE CHARGER COUPLING

[75] Inventors: Masahiko Terazoe; Takashi Hyogo, both of Kariya, Japan

[73] Assignee: Kabushiki Kaisha Toyoda Jidoshokki Seisakusho, Aichi-Ken, Japan

[21] Appl. No.: 09/255,431

[22] Filed: Feb. 22, 1999

[30] Foreign Application Priority Data

Feb. 23, 1998 [JP] Japan .................................. 10-040561

[51] Int. Cl.⁷ .................................................. H01M 10/46
[52] U.S. Cl. .................................................. 320/108
[58] Field of Search ........................... 320/107, 108, 320/FOR 101; 336/DIG. 2

[56] References Cited

U.S. PATENT DOCUMENTS 5,463,303  10/1995  Hall et al. .
5,483,143  1/1996  Hall et al. .............................. 320/108
5,594,315  1/1997  Ramos et al. .......................... 320/108

FOREIGN PATENT DOCUMENTS 6-178465  6/1994  Japan .

*Primary Examiner*—Edward H. Tso
*Attorney, Agent, or Firm*—Morgan & Finnegan, L.L.P.

[57] ABSTRACT

An inductive charger coupling for charging a battery. The coupling includes a charging paddle and a charging receptacle. The paddle is connected to an external power source and includes a primary core and a primary coil. The receptacle is connected to the battery and includes a secondary core, a secondary coil and a housing. The housing accommodates the secondary core and the secondary coil. When charging the battery, the paddle is inserted in the receptacle. The housing conforms to the secondary core and the secondary coil and has radiator fins on its outer surface. The housing and the fins reduce the size of the coupling while improving the cooling efficiency.

20 Claims, 7 Drawing Sheets

COOLING STRUCTURE FOR INDUCTIVE CHARGER COUPLING

BACKGROUND OF THE INVENTION

The present invention relates to an inductive charger coupling for charging batteries such as batteries of electric vehicles.

As illustrated in FIGS. 11, 12 and 13, a prior art inductive charger coupling 100 includes a charging receptacle 100a and a charging paddle 100b. The paddle 100b is provided at an electric-power supply station. As illustrated in FIG. 12, the receptacle 100a includes a ferrite core 110, which forms a magnetic circuit, a secondary coil 120 wound about the core 110 and housing 130 for accommodating the core 110 and the secondary coil 120. The secondary coil 120 is manufactured by winding a wire of a conductive metal, such as copper.

The core 110 includes an upper core piece 110a and a lower core piece 110b, each of which has a generally E-shaped cross section as illustrated in FIG. 13. The combined core pieces 110a and 110b, or the core 110, form a center pillar 112 and side pillars 114a, 114b. The side pillars 114a, 114b are coupled to the center pillar 112 by bridge sections 116a, 116b, which forms a magnetic circuit.

The core 110 and the secondary coil 120 are fixed to the housing 130 by supporting members (not shown). The inner wall of the housing 130 and the core 110 define a space 132, which allows air to flow.

The housing 130 has inlets 134 formed in its upper and lower walls and a fan 140 attached to one end. Outlets 136 are formed next to the fan 140. Rotation of the fan 140 introduces air through the inlets 134 into the space 132 and discharges air from the outlets 136.

The magnetic paddle 100b includes an annular primary coil 150. When the paddle 100b is plugged into the receptacle 100a, the primary coil 150 is coaxially aligned with the secondary coil 129.

Alternating current supplied to the primary coil 150 induces current in the secondary coil 120. The induced current is supplied to a vehicle battery via a rectifier, which charges the battery. Charging of the battery, or the induction in the inductive charger coupling 100, heats the core 110 and the secondary coil 120. The fan 140 is actuated to move air through the space 132. The air cools the core 110 and the secondary coil 120.

Accordingly, the core 110 and the secondary coil 120 are cooled. However, the complex arrangement of the core 110 and the secondary coil 120 in the housing 130 complicates the air passage formed in the space 132. This increases the air resistance of the space 132, which hinders the flow of air through the space 132. As a result, the coil 110 and the secondary coil 120 are not efficiently cooled.

In order to efficiently cool the core 110 and the secondary coil 120, the number or the size of the inlets 134 and the outlets 136 may be increased. Alternatively, the space 132, which surrounds the core 110 and the secondary coil 120, may be enlarged to reduce the air resistance. However, larger inlets 133 and outlets 136 or an increased number of the inlets 133 and the outlets 136 increases the amount of electromagnetic energy escaping from the housing 130. That is, these measures will reduce the ability of the housing 130 to shield the electromagnetic waves generated by the core 110 and the secondary coil 120. On the other hand, enlarging the space 132 enlarges the size of the housing 130. This increases the size of the inductive charger coupling 100.

Further, dust may partly cover the inlets 134 and the outlets 136 or may enter the space 132. Dust at the inlets 134 and the outlets 136 and in the space 132 hinders airflow, thereby hindering the cooling of the core 110 and the secondary coil 120.

SUMMARY OF THE INVENTION

Accordingly, it is an objective of the present invention to provide a compact inductive charger coupling that effectively shields electromagnetic wave and has an improved cooling efficiency.

To achieve the foregoing and other objectives and in accordance with the purpose of the present invention, an inductive coupling for electrically connecting a battery to a power source such that the battery is charged is provided. The coupling includes a charging paddle and a receptacle. The charging paddle includes a primary core and a primary coil. The primary coil is wound around the primary core. The receptacle receives the paddle and includes a secondary core, a secondary coil, which is wound around the secondary core, and a housing for accommodating the secondary core and the secondary coil. When the paddle is inserted in the housing, current supplied from the power source to the primary coil induces current in the secondary coil. The housing generally conforms to the secondary core and the secondary coil to facilitate conductive heat transfer from the secondary core and secondary coil to the housing. The housing includes a plurality of radiator fins that transfer heat from the housing to the ambient air.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 2:
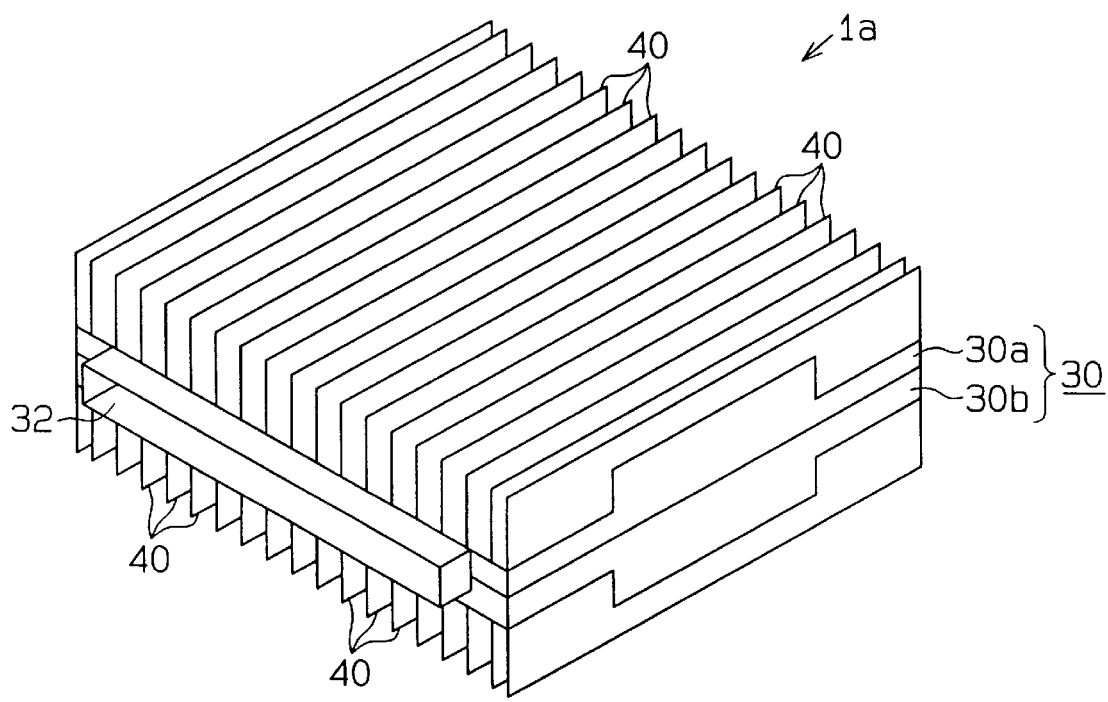
FIG. 2 is a perspective view showing the receptacle of FIG. 1.
Figure 3:
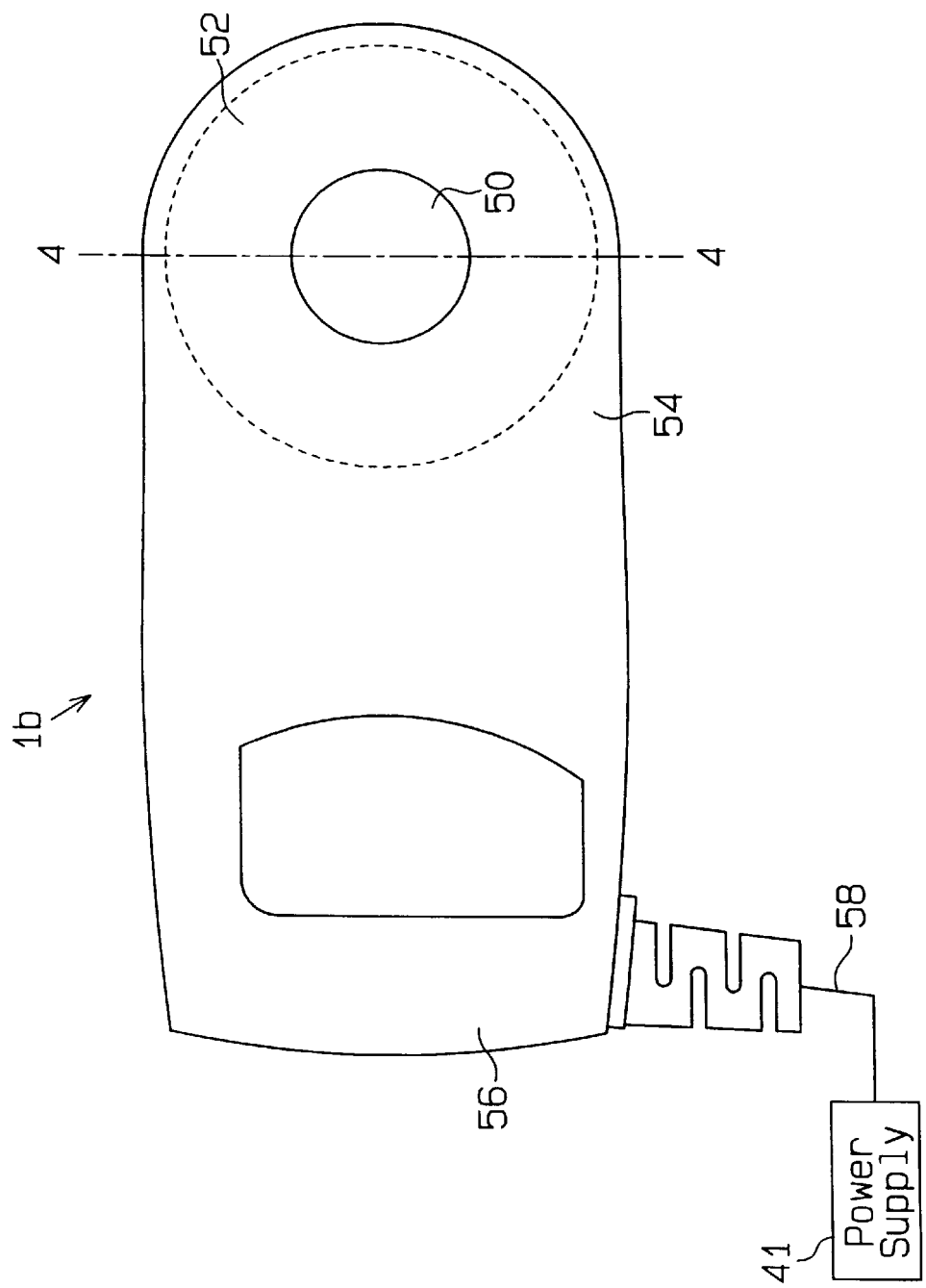
FIG. 3 is a plan view showing a charging paddle of the inductive charger coupling of the first embodiment.
Figure 4:
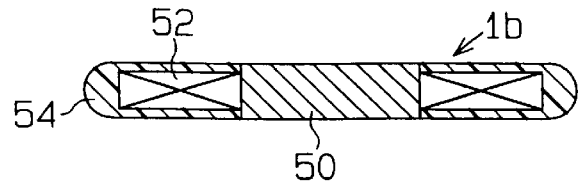
FIG. 4 is a cross-sectional view taken along line 4—4 of FIG. 3.

A first embodiment of the present invention will now be described with reference to FIGS. 1 to 5. An inductive charger coupling includes a charging receptacle a (FIGS. 1 to 2) and a charging paddle 1b (FIGS. 3 and 4). The receptacle 1a is employed, for example, in an electric vehicle and is connected to a vehicle battery 11. As illustrated in FIG. 2, the charging paddle 1b is connected to a power source 41.

Figure 1:
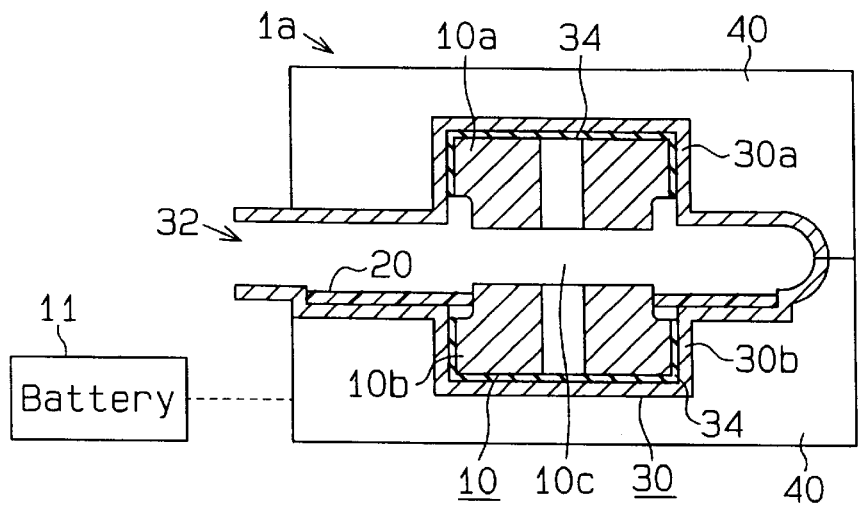
FIG. 1 is a cross sectional view of a receptacle of an inductive charger coupling according to a first embodiment of the present invention.

As shown in FIG. 1, the receptacle 1a includes a core 10 for forming a magnetic circuit, a secondary coil 20 wound about the core 10 and a housing 30 for accommodating the core 10 and the secondary coil 20. The housing 30 wraps around, or conforms to, the core 10 and the secondary coil 20. As shown in FIG. 2, radiator fins 40 are formed on the housing 30. The housing 30 has an opening, or slot 32, for receiving the paddle 1b.

Figure 11:
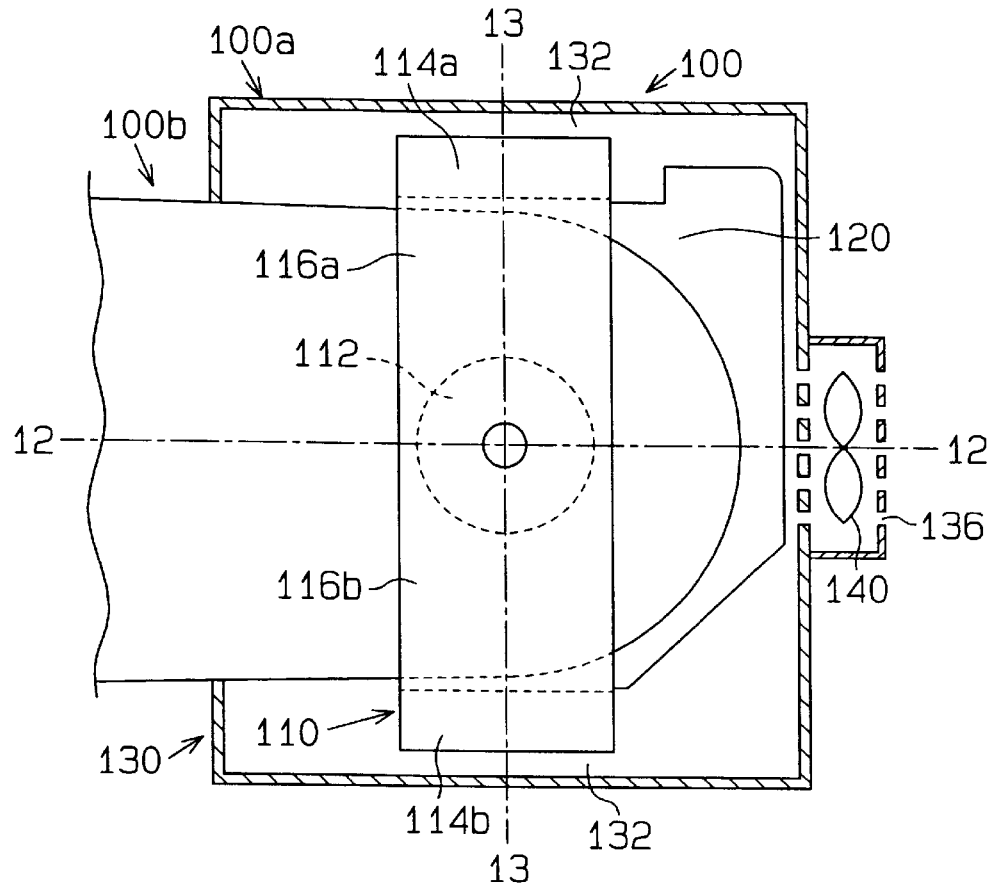
FIG. 11 is a schematic cross-sectional plan view of a prior art inductive charger coupling, showing the charging paddle plugged into the charging receptacle.
Figure 12:
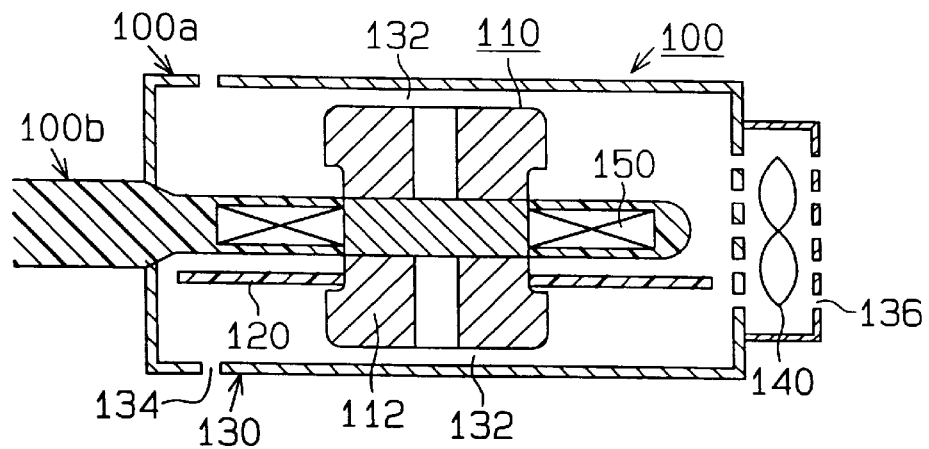
FIG. 12 is a cross-sectional view taken along line 12—12 of FIG. 11.
Figure 13:
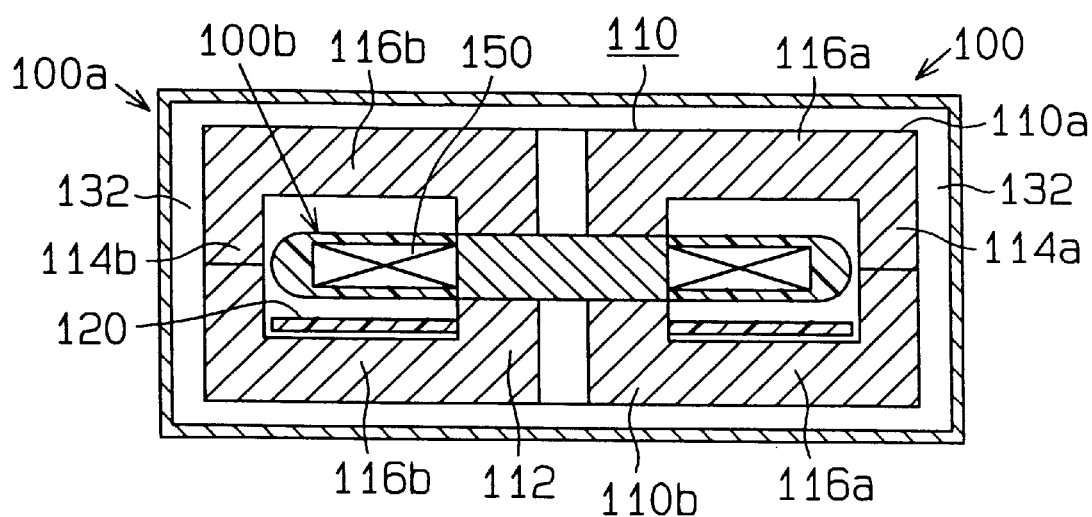
FIG. 13 is a cross-sectional view taken along line 13—13 of FIG. 11.

The core 10 includes an upper core piece 10a and a lower core piece 10b, each of which has a generally E-shaped cross-section like the core pieces 110a and 110b of FIG. 13. Like the prior art coupling of FIGS. 11 to 13, the cores 10a, 10b form a center pillar and two side pillars. The center pillar is coupled to the side pillars by bridge sections. The center pillar, the side pillars and the bridge sections form a magnetic circuit. The center pillar has a slot 10c at its central portion for receiving the paddle 1b. The secondary coil 20 includes resin board and an annular coil housed in the board.

The housing 30 is formed by an upper housing shell 30a and a lower housing shell 30b, which are made of aluminum or aluminum alloy. The housing shells 30a, 30b are attached to the core 10 and the secondary coil 10a from above and below. A heat transfer seal 34 is located between the upper housing shell 30a and the upper core piece 10a and between the lower housing shell 30b and the lower core piece 10b. The seal 34 is made of heat conductive silicon rubber. The lower housing shell 30b and the secondary coil 20 are fastened to each other by a screw such that the lower housing shell 30b is pressed against the secondary coil 20. The seal 34 between the lower housing shell 30b and the secondary coil 20 may be replaced with silicon grease. In this case, the space between the lower housing shell 30b and the secondary coil 20 is sealed to prevent the grease from leaking.

The housing 30 is surrounded by radiator fins 40. The radiator fins 40 are made, for example, of aluminum or aluminum alloy. The fins 40 are separately manufactured from the housing 30 and welded to the housing 30. The fins 40 may be formed integrally with the housing 30.

As illustrated in FIGS. 3 and 4, the paddle 1b includes a ferrite core shaft 50, an annular primary coil 52 wound about the core shaft 50, a coil case 54 for accommodating the primary coil 52, and a grip 56. The coil case 54 is made of insulating resin and is integrated with the grip 56. The grip 56 has a terminal 58 for extracting a lead line connected to the primary coil 52. A power supply line 58 extends from the grip 56 for electrically coupling the paddle 1b to the external power source 41.

The primary coil 52 is manufactured by winding a wire of a conductive metal, such as copper, around the core shaft 50.

Figure 5:
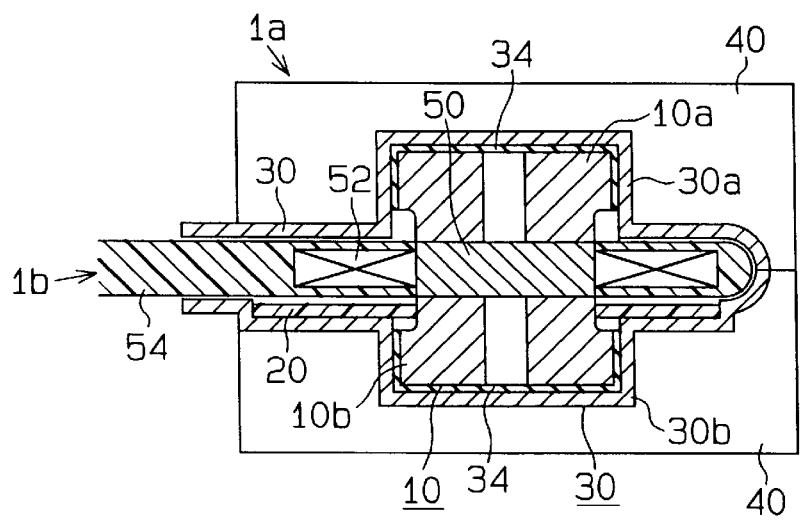
FIG. 5 is a cross-sectional view of the inductive charger coupling of the first embodiment, showing the charging paddle plugged into the charging receptacle.

The primary coil 52 has a diameter that is substantially the same as that of the secondary coil 20. To initiate charging of the battery 11, the paddle 1b is inserted into the receptacle 1a as illustrated in FIG. 5, so that the core shaft 50 of the paddle 1b is fitted in the slot 10c formed in the center pillar of the core 10. The primary coil 52 is coaxially aligned with the secondary coil 20.

In this state, the power source 41 supplies current to the primary coil 52. The current in the primary coil 52 induces electromagnetic force in the secondary coil 20. Current generated by the electromagnetic force of the secondary coil 20 is supplied to the vehicle battery 11, which is connected to the receptacle 1a, via a rectifier (not shown). Charging of the battery 11 generates electromagnetic waves in the core 10, the secondary coil 20 and the paddle 1b. The generated electromagnetic waves are almost completely shielded by the housing 30.

Heat generated by the core 10 is transferred to the housing 30 through the seal 34. Heat generated by the secondary coil 20 is directly transferred to the housing 30. Heat transferred to the housing 30 is then transferred to the radiator fins 40. Heat of the housing 30 and the fins 40 is transferred to the ambient air. This efficiently cools the core 10 and the secondary coil 20 thereby preventing high temperatures of the core 10 and the secondary coil 20.

There is essentially nothing that serves as an insulator between the housing 30 and the core 10 or between the housing 30 and the secondary coil 20. Thus, heat generated by the core 10 and the secondary coil 20 is directly conducted to the housing 30 and the radiator fins 40. The heat conducted to the housing 30 and the fins 40 is transferred to the ambient air by radiation and convection. The fins 40 increase the surface area of the housing 30 thereby improving the heat transfer effect. In other words, the fins 40 effectively cool the core 10 and the secondary coil 20 and prevent the core 10 and the secondary coil 20 from overheating.

The design of the housing 30 therefore eliminates the need to force air through the housing 30 to cool the core 10 and the secondary coil 20. Thus, there is no need to provide air inlets and outlets in the housing 30 for cooling the core 10 and the coil 20. Further, there is no need to provide a large space in the housing 30. Thus, the housing 30 not only shields most of electromagnetic waves generated by the core 10 and the secondary coil 20 but also reduces the size of the receptacle 1a. Even if the receptacle 1a is used in a dusty environment, the housing 30 effectively cools the core 10 and the secondary coil 20.

The housing 30 and the radiator fins 40 are made of aluminum or aluminum alloy and therefore have high heat conductivity. Heat of the core 10 and the secondary coil 20 is therefore rapidly transferred from the housing 30. In other words, the core 10 and the secondary coil 20 are efficiently cooled.

Aluminum and aluminum alloy are light and nonmagnetic. Thus, the housing 30 and the fins 40 reduce the weight of the receptacle 1a and are not magnetized. Especially, if made of aluminum alloy, the housing 30 and the radiator fins 40 have high heat resistance and high corrosion resistance.

The heat transfer seal 34 is located between the housing 30 and the core 10. Therefore, even if the housing 30, the core 10 and the secondary coil 20 do not have smooth surfaces, the seal 34 displaces air that would otherwise function as a heat insulator between the housing 30 and the core 10. Further, the seal 34 may be omitted and the core 10 and the secondary core 20 may directly contact the housing 30.

It should be apparent to those skilled in the art that the present invention may be embodied in many other specific forms without departing from the spirit or scope of the invention. Particularly, it should be understood that the invention may be embodied in the following forms.

Figure 6:
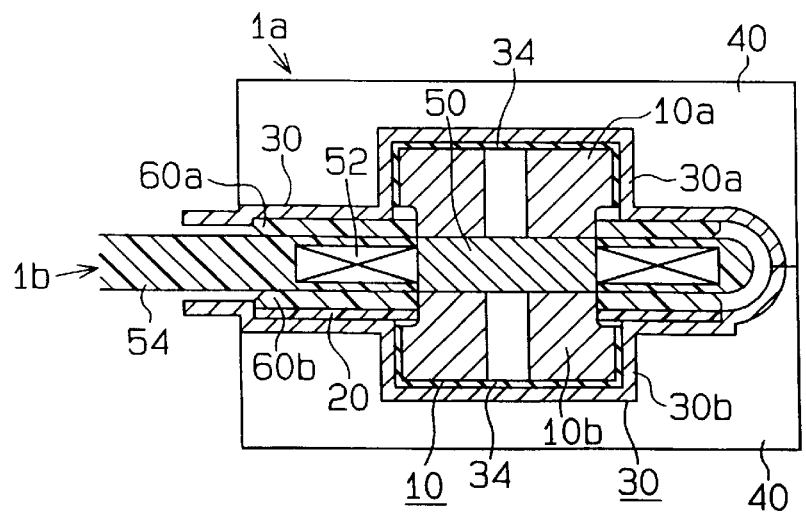
FIG. 6 is a cross-sectional view like FIG. 5 illustrating an inductive charger coupling according to a second embodiment.

FIG. 6 shows an inductive charger coupling according to a second embodiment of the present invention. The housing 30 shown in FIG. 6 includes guides 60a, 60b made of heat conductive material. The guides 60a, 60b are located on the inner wall of the housing 30 to smoothly guide the paddle 1b to the predetermined insertion position.

The guides 60a, 60b are made of metal such as aluminum or copper or of a carbon fiber resin of high heat conductivity. The material and surface condition of the guides 60a, 60b and the contact area between the paddle 1b and the guides 60a, 60b can be optimally determined such that friction is minimized and heat conductivity is maximized.

When inserting the paddle 1b into the receptacle 1a, there is little friction between the guides 60a, 60b and the paddle 1b. Heat of the paddle 1b is first transferred to the guides 60a, 60b, especially to the upper guide 60a. The heat transferred to guides 60a, 60b is then mainly transferred to the housing 30. Consequently, the core 10, the secondary coil 20 and the paddle 1b are effectively cooled.

Figure 7:
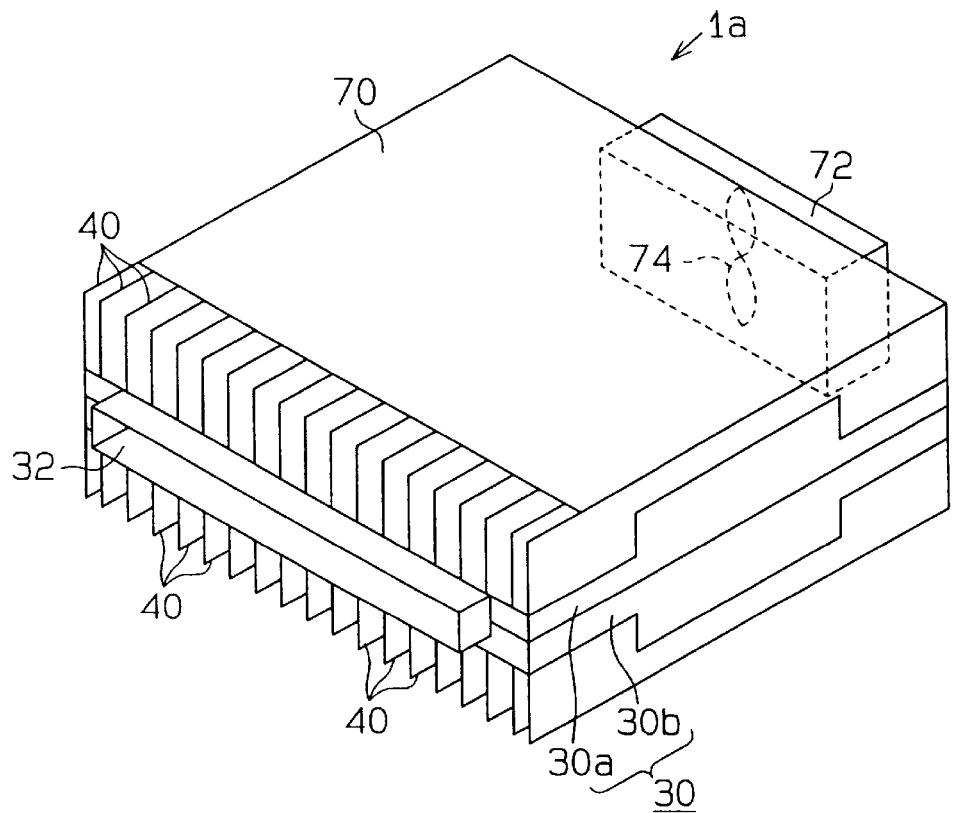
FIG. 7 is a perspective view like FIG. 2 showing the receptacle of an inductive charger coupling according to a third embodiment.

FIG. 7 shows an inductive charger coupling according to a third embodiment of the present invention. The receptacle of FIG. 7 has an air guide 70 covering the radiator fins 40. The air guide 70 includes a fan case 72 for accommodating a fan 74.

Rotation of the fan 74 forces air between adjacent fins 40. The air lowers the temperature of the fins 40. Therefore, compared to the coupling of FIG. 1, the core 10 and the secondary coil 20 of FIG. 7 are more effectively cooled. Since the coupling of FIG. 7 has the radiator fins 40, the fan 74 cools the receptacle more effectively than the fan of the prior art receptacle of FIGS. 11 to 13. Thus, the operating time of the fan 74 may be shortened and the size of the fan 74 may be reduced.

Figure 8:
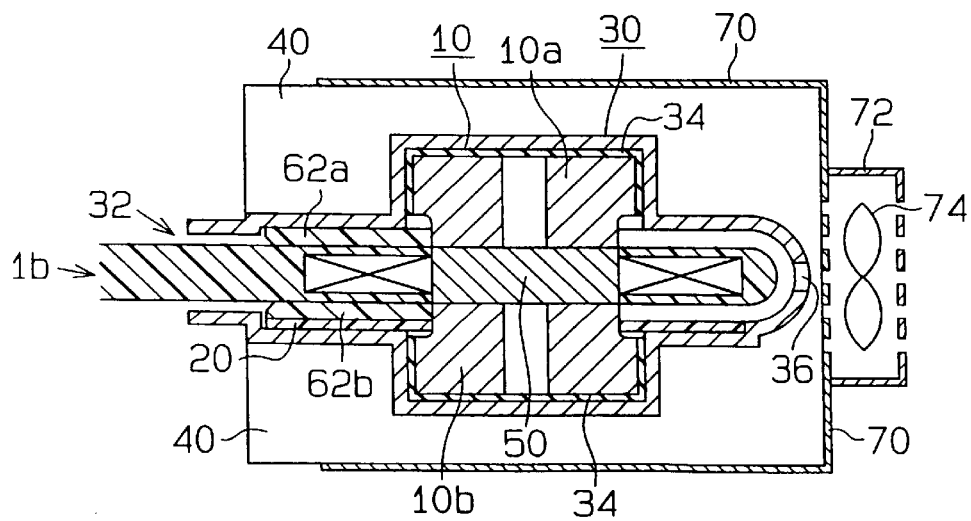
FIG. 8 is a cross-sectional view like FIG. 5 illustrating an inductive charger coupling according to a fourth embodiment.
Figure 9:
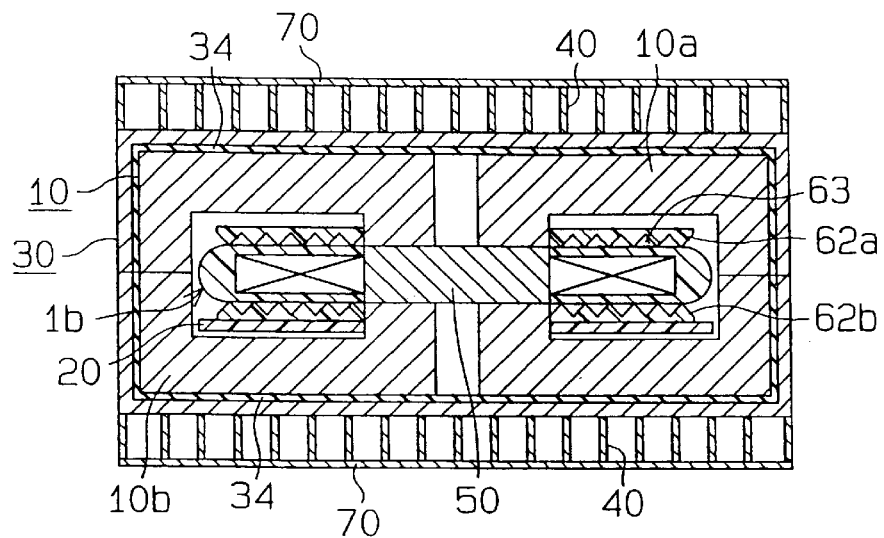
FIG. 9 is a cross-sectional view like FIG. 13 illustrating an inductive charger coupling according to a fifth embodiment.

FIGS. 8 and 9 show a coupling according to a fourth embodiment of the present invention. The receptacle of FIGS. 8 and 9 is the same as the receptacle of FIG. 7 except that the housing 30 includes guides 62a, 62b made of heat conductive material. The guides 62a, 62b are located on the inner wall of the housing 30 and slidably contact the paddle 1b. The guides 62a, 62b are made of metal such as aluminum or copper or of a carbon fiber resin of high heat conductivity. The guides 62a, 62b also have grooves 63 extending in the direction of movement of the paddle 1b. The housing 30 includes a hole 36 at the end opposite side to the slot 32. The hole 36 communicates the interior of the housing 30 with the outside.

Rotation of the fan 74 forces air between the radiator fins 40. The rotation also forces air through the housing 30 from the slot 32 to the hole 36. The air passing through the fins 40 effectively cools the housing 30 and the fins 40, and the air passing through in the housing 30 effectively cools the paddle 1b.

Some of the heat generated by the paddle 1b is transferred to the guides 62a, 62b contacting the paddle 1b. Some of the heat of the secondary coil 20 is transferred to the lower guide 62b. The air flowing along the grooves 63 cools the guides 62a, 62b. Further, some of the heat transferred to the upper guide 62a is transferred to the radiator fins 40 by way of the housing 30 and is thus transferred to the ambient air. In this manner, the receptacle of FIGS. 8 and 9 has an improved cooling efficiency compared to the receptacle of FIG. 7.

Figure 10:
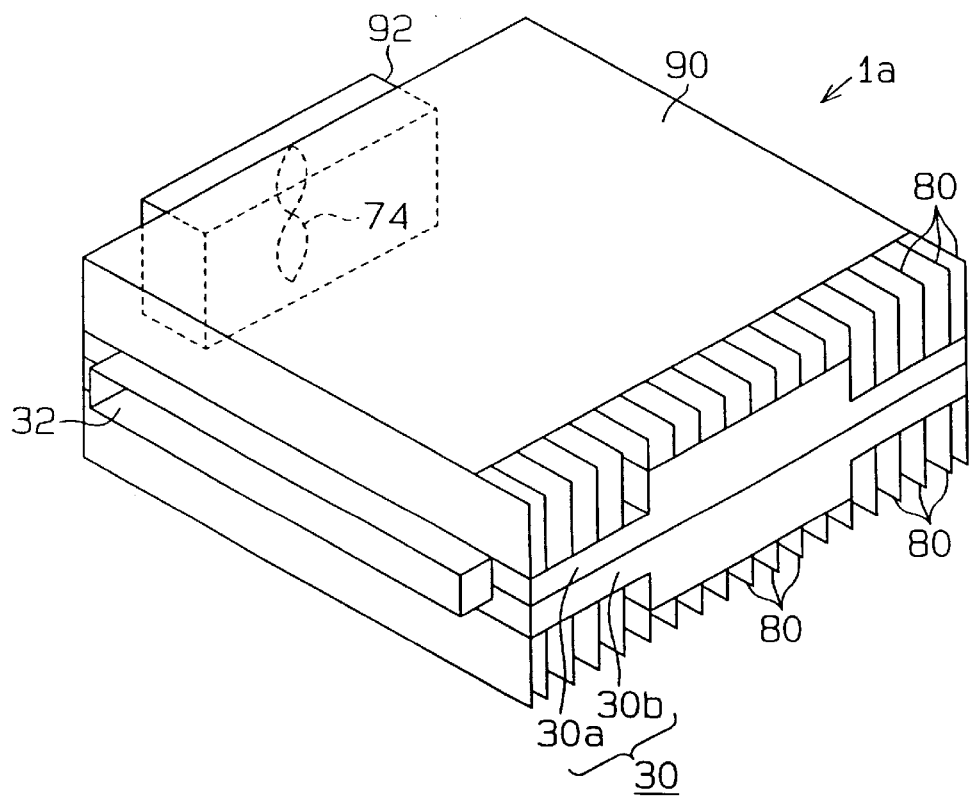
FIG. 10 is a perspective view like FIG. 2 showing the receptacle of an inductive charger coupling according to a sixth embodiment.

FIG. 10 shows a receptacle according to a fifth embodiment. The housing 30 has radiator fins 80 on its upper and lower surfaces. The fins 80 are perpendicular to the plane of the paddle 1b, and they extend longitudinally in the direction of movement of the paddle 1b. The fins 80 are covered by an air guide 90. The air guide 90 includes a fan 74. Rotation of the fan 74 forces air between the fins 80, which effectively cools the housing 30 and the fins 80. As a result, the core 10 and the secondary coil 20 are effectively cooled. The air guide 90 and the fan 74 may be omitted.

Therefore, the present examples and embodiments are to be considered as illustrative and not restrictive and the invention is not to be limited to the details given herein, but may be modified within the scope and equivalence of the appended claims.

What is claimed is:

1. An inductive coupling for electrically connecting a battery to a power source such that the battery is charged, the coupling comprising:

a charging paddle, wherein the paddle includes a primary core and a primary coil, the primary coil being wound around the primary core;

a receptacle for receiving the paddle, wherein the receptacle includes a secondary core, a secondary coil which is wound around the secondary core, and a housing for accommodating the secondary core and the secondary coil, wherein, when the paddle is inserted in the housing, current supplied from the power source to the primary coil induces current in the secondary coil, wherein the housing generally conforms to the secondary core and the secondary coil to facilitate conductive heat transfer from the secondary core and secondary coil to the housing, and wherein the housing includes a plurality of radiator fins that transfer heat from the housing to the ambient air; and a heat conductive seal located between the housing and the secondary core such that there is substantially no air space between the secondary core and the housing.

2. The coupling according to claim 1, wherein the housing and the fins are made of aluminum or aluminum alloy.

3. The coupling according to claim 1, wherein the receptacle further includes:

a guide plate for covering the fins, and a fan for forcing air between the fins.

4. The coupling according to claim 1, wherein the heat conductive seal is made of heat conductive silicon rubber.

5. The coupling according to claim 1, wherein a heat conductive guide is located in the housing, and wherein the paddle is guided by the heat conductive guide when inserted into the housing.

6. The coupling according to claim 5, wherein the heat conductive guide contacts the inner surface of the housing, and wherein the paddle slides on the heat conductive guide when inserted into the housing.

7. The coupling according to claim 6, wherein the heat conductive guide is made of low-friction material having high heat conductivity.

8. The coupling according to claim 6, wherein the housing has an opening into which the paddle is inserted, and a hole is formed at an end of the housing that is opposite to the opening to communicate the interior of the housing with the outside, and wherein the heat conductive guide has a groove extending from the opening toward the hole.

9. The coupling according to claim 8, wherein the receptacle includes a fan to force air from the opening to the hole along the groove.

10. The coupling according to claim 1, wherein the fins extend in the direction of movement of the paddle.

11. The coupling according to claim 1, wherein the fins are substantially perpendicular to the paddle and the fins extend in a direction perpendicular to the direction of movement of the paddle.

12. An inductive coupling for electrically connecting a battery to a power source such that the battery is charged, the coupling comprising:

a charging paddle, wherein the paddle includes a primary core and a primary coil, the primary coil being wound around the primary core;

a receptacle for receiving the paddle, wherein the receptacle includes a secondary core, a secondary coil, which is wound around the secondary core, and a housing for accommodating the secondary core and the secondary coil, wherein, when the paddle is inserted in the housing, the primary coil is coaxially aligned with the secondary coil and current supplied from the power source to the primary coil induces current in the secondary coil, wherein the housing generally conforms to the secondary core and the secondary coil and a plurality of radiator fins are formed on the outer surface of the housing, and wherein the housing and the fins are made of aluminum or aluminum alloy; and a heat conductive seal located between the housing and the secondary core.

13. The coupling according to claim 12, wherein the heat conductive seal is made of heat conductive silicon rubber.

14. The coupling according to claim 12, wherein the receptacle further includes:

a guide plate for covering the fins, and a fan for forcing air between the fins.

15. The coupling according to claim 12, wherein the receptacle includes a heat conductive guide, the heat conductive guide contacting the inner surface of the housing, and wherein the paddle slides on the heat conductive guide when inserted into the housing.

16. The coupling according to claim 15, wherein the heat conductive guide is made of low-friction material having high heat conductivity.

17. The coupling according to claim 15, wherein the housing has an opening into which the paddle is inserted, and a hole is formed at an end of the housing that is opposite to the opening to communicate the interior of the housing with the outside, and wherein the heat conductive guide has a groove extending from the opening toward the hole.

18. The coupling according to claim 17, wherein the receptacle includes a fan to force air from the opening to the hole along the groove.

19. An inductive coupling for electrically connecting a battery to a power source such that the battery is charged, the coupling comprising:

a charging paddle, the paddle including a primary core and a primary coil, the primary coil being wound around the primary core;

a receptacle for receiving the paddle, the receptacle including a secondary core, a secondary coil which is wound around the secondary core, and a housing for accommodating the secondary core and the secondary coil, wherein the inner surface of the housing is located in close proximity to the secondary core, the secondary coil and a distal portion of the paddle to facilitate conductive heat transfer from the cores and coils to the housing;

a plurality of convective fins located on the outer surface of the housing to transfer heat from the housing; and a heat-conducting seal located between and contacting the housing and the secondary core to facilitate conductive heat transfer between the secondary core and the housing.

20. An inductive coupling for electrically connecting a battery to a power source such that the battery is charged, the coupling comprising:

a charging paddle, wherein the paddle includes a primary core and a primary coil, the primary coil being wound around the primary core;

a receptacle for receiving the paddle, wherein the receptacle includes a secondary core, a secondary coil, which is wound around the secondary core; and a housing for accommodating the secondary core and the secondary coil, wherein, when the paddle is inserted in the housing, current supplied from the power source to the primary coil induces current in the secondary coil, wherein the housing generally conforms to the secondary core and the secondary coil to facilitate conductive heat transfer from the secondary core and secondary coil to the housing, wherein the housing includes a plurality of radiator fins that transfer heat from the housing to the ambient air, wherein a heat conductive guide is located in the housing and contacts the inner surface of the housing, wherein the paddle is guided by and slides on the heat conductive guide when inserted into the housing, wherein the housing has an opening into which the paddle is inserted, and a hole is formed at the end of the housing that is opposite to the opening to communicate the interior of the housing with the outside, wherein the heat conductive guide has a groove extending from the opening toward the hole, and wherein the receptacle includes a fan to force air from the opening to the hole along the groove.

* * * * *